United States Patent
Buchmann et al.

[15] 3,672,509
[45] June 27, 1972

[54] DIALYSIS APPARATUS

[72] Inventors: Paul Buchmann, Basel, Switzerland; Monique Beringer, St. Louis, France

[73] Assignee: Solco Basel AG, Basel, Switzerland

[22] Filed: June 22, 1970

[21] Appl. No.: 48,113

[30] Foreign Application Priority Data

July 8, 1969    Luxembourg..............................59.061

[52] U.S. Cl. ........................................................210/321
[51] Int. Cl. ........................................................B01d 13/00
[58] Field of Search ..................210/22, 23, 321, 541; 55/16, 55/158; 23/258.5

[56] References Cited

UNITED STATES PATENTS

| | | | |
|---|---|---|---|
| 2,411,238 | 11/1946 | Zender | 210/321 |
| 2,049,828 | 8/1936 | Stevens | 210/22 X |
| 3,289,846 | 12/1966 | Warrington et al. | 210/321 X |
| 2,692,854 | 10/1954 | Hoch et al. | 210/321 X |
| 2,985,587 | 5/1961 | Hoch et al. | 210/321 |
| 3,459,176 | 8/1969 | Leonard | 200/321 X |
| 3,536,611 | 10/1970 | Filippi et al. | 210/321 X |
| 3,312,043 | 4/1967 | Sexton | 55/158 |
| 3,558,481 | 1/1971 | Furgerson | 210/321 X |
| 3,256,678 | 6/1966 | Bertin et al. | 55/158 |
| 3,442,002 | 5/1969 | Geary et al. | 55/158 |
| 3,228,877 | 1/1966 | Mahon | 210/22 |
| 3,526,001 | 8/1970 | Smith | 210/321 X |
| 3,019,904 | 2/1962 | Stecher | 210/23 |
| 3,457,170 | 7/1969 | Havens | 210/321 X |
| 2,683,117 | 6/1954 | Rosenak et al. | 210/321 |
| 3,583,907 | 6/1971 | Borsanyi | 210/22 |

OTHER PUBLICATIONS

Kupfer et al., Transactions American Society for Artificial Internal Organs, pp. 2–7, 1959

Primary Examiner—Reuben Friedman
Assistant Examiner—Richard Barnes
Attorney—Karl F. Ross

[57] ABSTRACT

A dialysis apparatus having at least one unit in which an outer generally cylindrical tube forms a through-flow vessel closed at its ends with caps provided with inlet and outlet conduits for the fluid. A semipermeable foil or membrane forms an inner coaxial tube and is supported within the outer tube while having means for passing another liquid through its interior. The dialysis unit may be ganged in banks connected in cascade, the banks being shiftable to afford access to the individual units for replacement or otherwise.

2 Claims, 10 Drawing Figures

PATENTED JUN 27 1972

Paul Buchmann
Monique Béringer
INVENTORS.

BY

Karl F. Ross
Attorney

Paul Buchmann
Monique Béringer
INVENTORS.

BY

Karl G. Ross
Attorney

Paul Buchmann
Monique Béringer
INVENTORS.

BY

Karl J. Ross
Attorney

DIALYSIS APPARATUS

1. FIELD OF THE INVENTION

Our present invention relates to a dialysis apparatus and, more particularly, to a dialyzer of the continuous-flow type and to a dialysis plant incorporating same.

2. BACKGROUND OF THE INVENTION

Dialysis can be described as a process in which a membrane separates a feed liquid (liquor) having a concentration of a soluble substance (solute) of one level and a liquid (solvent) containing this substance at a different concentration or originally free from this substance, such that the concentration of the solute in the feed liquor or dialyzate on one side of the membrane decreases while the concentration of the solute in the liquid or liquor (diffusate) on the other side is increased.

To this end the membrane is semipermeable, i.e., is selective as to the molecular species which traverse the membrane from one compartment to another. Typical membranes are regenerated cellulose, synthetic resins and the like. The process of dialysis can be applied to solutions of substances having widely different molecular weights and various solvents, although it is most common to use water as the solvent. The dialysis depends upon the diffusion of the solute through the membrane and may be used to separate solutes of different diffusion rates. Complete separation is possible if one of the substances is molecularly too large to pass through the membrane pores. For the most part, therefore, the membrane acts as a molecular sieve separating a compartment on one side from a compartment on the other and selectively allowing molecular species of appropriate size to migrate across the membrane.

An apparatus for dialysis in accordance with these principles may comprise, based upon prior-art teachings, tubes of the semipermeable foil which are suspended within a dialysis vessel to separate the diffusate chamber from the dialyzate chamber. The tubes are closed at their lower ends and are supported at their upper ends in the dialysis vessel and are charged discontinuously from above with the liquid to be subjected to dialysis. The space surrounding the tubes of the semipermeable foil is filled with the dialysis liquid which, therefore, is introduced directly into the vessel. Such dialysis apparatus has several disadvantages when considered for use in an industrial process. For example, the membranous tubes are filled chargewise, i.e., intermittently or discontinuously, thereby precluding continuous flow of the liquor to be subjected to dialysis. Furthermore, the dialysis efficiency is lowered by the fact that a stagnant layer of liquid forms along the membrane because of the inability to circulate the liquor within the tubes. A further disadvantage resides in the fact that the entire charge becomes unsuitable upon the rupture of any one of the tubes or when leakage across the membrane develops.

In another conventional dialysis apparatus, the semi-permeable foils are supported on frames in parallel relationship and with a spacing within the dialysis vessel. Between each pair of neighboring plates a dialysis compartment is formed. The alternate dialysis compartments are filled with the liquor to be subjected to dialysis and with the liquor adapted to receive the solute which diffuses through the membranes, respectively. This system has the advantage that it provides a a large ration of membrane area to compartment volume, but the disadvantages that it is difficult to maintain the planarity of the foils and to replace foils which may become unusable. Furthermore, the foils tend to bulge or deform, thereby reducing the flow cross-section and volume of the interfoil spaces and, therefore, the capacity of the apparatus.

3. OBJECTS OF THE INVENTION

It is, therefore, the principal object of the present invention to provide an improved dialysis apparatus obviating the aforementioned disadvantages.

It is another object of the invention to provide a relatively low-cost, high-efficiency dialysis apparatus in which deformation of the dialyzer membrane is limited or prevented from materially affecting the capacity or efficiency of the dialysis operation.

It is also an object of the invention to provide a dialysis apparatus in which the dialyzer membrane can be replaced with ease.

Another object of the instant invention is the provision of an apparatus for the dialysis transfer of a solute between liquids which prevents reduction in efficiency as a consequence of the formation of stagnant liquid layers adjacent the membrane.

An additional object of the invention is to provide a high-efficiency dialysis apparatus which is free from the batch-type or charge processing of the liquor as described above.

Yet further, it is an object of our invention to provide a dialysis system capable of use in many industrial and technological processes.

4. SUMMARY OF THE INVENTION

These objects and others which will become apparent hereinafter are attained, in accordance with the present invention, with a dialysis apparatus in which the dialysis vessel consists of a liquid-tight duct or pipe, sealed at both ends, while the membrane is formed as a smaller-diameter tube received substantially coaxially within the dialysis vessel and likewise sealed at its ends in a liquid-tight manner. The ends of the duct and the membrane tube are provided, according to the present invention, with inlet and outlet conduits, fittings and like means for delivery and removing the respective liquors in a substantially continuous flow.

In this manner, there is provided an elongated central compartment within the membrane tube and an annular elongated compartment between the membrane tube and the surrounding wall of the duct, the compartments serving one as a dialyzer space and the other as the dialysate space. Preferably, the compartment surrounding the membrane tube (outer compartment) constitutes the dialyzer-filled space while the central compartment (inner compartment) serves as the dialysate space.

The liquor in the outer compartment, therefore, can flow uniformly along the entire outer surface of the membrane or foil and thereby obviate the formation of stagnant layers. It may be noted that it is not essential, although it is preferred, that the inner tube (membrane) be provided precisely coaxial with the outer tube (dialysis vessel) as long as the axes of the tubes are mutually parallel, since a uniform flow along the membrane tube is assured even with wide deviations from precise coaxial positioning.

As suggested earlier, the present invention provides preferably an axial flow of the liquors through the compartments, for which the axial ends of the outer tube or vessel are provided with an inlet and an outlet, respectively. The conduits advantageously are formed in a pair of sealing caps closing the ends of a cylindrical sleeve and at least one of which is removable. The sleeve itself may support the inner or membrane tube via angularly equispaced struts or ribs. Similarly, the membrane may be formed as a tubular body closed at its ends by respective caps or plates which are provided with the conduits for feeding the respective liquor in axial direction through the membrane-enclosed inner compartment.

The throughflow may either be of the countercurrent type, in which the liquors of the inner and outer compartments flow axially in opposite directions, or of the concurrent type, in which the liquors flow in the same general axial direction. In each case, the flow of liquid through the compartment serves to sweep solute-depleted liquid layers and solute-rich liquid layers away from the surfaces of the membrane as solute transfer therethrough occurs, thereby avoiding the formation of stagnant layers.

To increase the latter effect, one or both of the compartments may be provided with turbulence-inducing formations which break the laminar flow lines of the liquids and increase the effectiveness of the disruption of potentially stagnating layers.

According to a more specific feature of this invention, a plurality of such dialysis units are provided in cascade, i.e., with the liquor passing in succession through the outer compartments of a bank of dialysis devices while the interiors of the inner membrane tube are connected in series as well. Here, too, the flow pattern may be concurrent or countercurrent. Moreover, the dialyzers, according to the present invention, may be arranged in parallel when, for example, a large volume of material is to be processed, but the dialysis time is relatively short. Consequently, parallel and cascade connection of the dialyzers may be used in any combination to accommodate the particular needs.

According to the present invention, a multiplicity of dialyzer units of the character described are combined in a single plant and are provided with ductwork enabling the series or parallel connection of the inner and outer compartments of dialyzer units. Standard dimensions for the individual dialyzers permit them to be interchanged functionally and structurally and, moreover, assure uniformity of a process operating with cascade, parallel or combination connections as described. The use of standardized dimensions, i.e., dialyzer units of identical length, diameter, capacity and friction to liquid flow, has the further advantage that the mounting of the units is simplified. When, for example, a membrane tube of a dialyzer unit, incorporated in a bank of such units in accordance with the present invention, becomes unusable, the entire dialyzer unit may be removed from the bank rapidly and replaced by an identical unit. Furthermore, a conduit network of the character described, which permits the selective connection of the dialyzer units in series or in parallel, allows any inoperative dialyzer unit to be cut out of the fluid path to enable replacement of the inoperative dialyzer, whereupon the replacement is switched into the system.

Still another feature of this invention resides in the provision of dialyzer-unit banks in series-connected or cascade arrangements with generally horizontal axes and arranged one above another while supported from common roller means. Advantageously, such roller means include an overhead trolley, shiftable along a rail. We have found that surprising technological advantages can be gained from the use of a plurality of such banks or cascade arrays in combination, upon a single rail. Not only does this arrangement increase the space utilization by the dialyzer units, but it also permits access to any inoperative unit. In fact, the dialyzer banks, each carried on a respective trolley, are horizontally shiftable in a direction transverse to the axis of the dialyzer units so that the banks can be brought together in close-fitting relationship. Along the path, there is provided a space sufficient to permit access to the banks which, as has been noted, may be moved to effectively transfer the space along the array of banks and afford access to any one of the dialyzer units.

The invention is preferably used in combination with processes for the preparation of bacteria, viruses and the decomposition and degradation processes thereof as well as liquids used in the medical, biomedical and biochemical fields. Such liquids include animal and vegetable extracts, by-products and derivatives, including animal blood, liver or spleen suspension for intravenous application. The latter liquors, from which bacteria, viruses and degradation products thereof must be separated, are subjected to dialysis according to the invention. For example, the membrane or foil may initially pass molecular species with the molecular weight up to 8000 and the liquor is dialyzed against sterile, pyrogen-free water, alcohol or water-alcohol mixtures and the like suitable for intravenous applications to humans. The dialyzate is subjected to a pyrogen test which, if negative, results in termination of the process; if the pyrogen test is positive, however, the process is continued or repeated using a membrane designed to pass smaller molecular species only. The resulting intravenous solution may be used as a stimulant for respiration and other biological processes.

5. DESCRIPTION OF THE DRAWING

The above and other objects, features and advantages of the present invention will become apparent from the following description, reference being made to the accompanying drawing in which.

6. SPECIFIC DESCRIPTION

Figure 1:
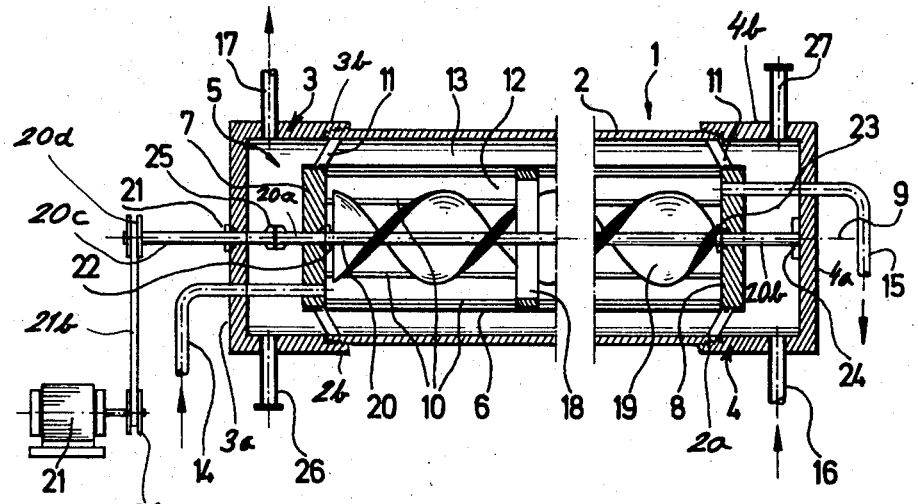
FIG. 1 is an axial cross-sectional view through a dialysis unit, according to the invention.

In FIG. 1 of the drawing, we show a dialysis unit 1 which comprises a cylindrical pipe 2 formed at its ends 2a and 2b with tapered pipe threads or other locking means upon which a pair of caps 3 and 4 can be seated in a fluidtight manner. With a thread connection as described, both caps can be removed. The caps 3 and 4 are each of cylindrical configuration with disk-shaped end portions 3a and 4a integral with cylindrical aprons 3b, 4b, the latter being formed with female tapered threads to accommodate the tapered male threads of the cylinder 2.

Within the cylindrical pipe 2, which forms the dialysis vessel together with the caps 3 and 4, there is coaxially provided a tube or hose 6 composed of a semipermeable foil and constituting a dialysis membrane. The support means, whereby the inner tube 6 is mounted within the pipe 2, is generally represented at 5. As is also apparent from FIG. 1, the support means 5 comprises a pair of rigid closure disks 7 and 8, disposed at opposite axial extremities of the tube 6 and centered on the axis 9 of the pipe 2.

Along the periphery of the disks 7 and 8, there are provided, in angularly equispaced relationship, struts 11 which extend radially outwardly to the inner wall of the tube 2 and are anchored to the latter so that the assemblies 6 through 8 can be received between the inner end of the struts 11 and are held in place thereby. The end plates 7 and 8 are, moreover, bridged by tierods 10 which are angularly equispaced about the tube 6 and lie generally along the generatrices thereof.

The tube 6, streched from the edge of closure disk 7 to the edge of closure disk 8, is supported against inward movement by the tierods 10 which form a cage around which the membrane is disposed. The tube 6 is, moreover, anchored to the plates 7 and 8 at its axial extremities so that the tierods may serve as tensioning elements which, as they urge the disks 7 and 8 apart, tension the tube 6 axially. The daimeter of tube 6 thus corresponds approximately to that of the array of supporting elements 10 and is less than the internal diameter of the pipe 2 so that the membrane 6 and the closure disks 7 and 8 define a cylindrical inner compartment 12 which extends substantially over the entire axial length of the pipe 2. Between the tube 6 and the pipe 2, there is defined an axially extending annular outer compartment 13 which is separated by the membrane 6 from the parallel compartment 12. The two compartments 12 and 13 are, of course, fluidtight.

While in the subsequent description it is observed that the inner compartment 12 preferably serves as the dialyzer space whereas the outer compartment 13 constitutes the dialyzate space, it will be understood that a reversal of the roles of the compartments is also possible.

Figure 2:
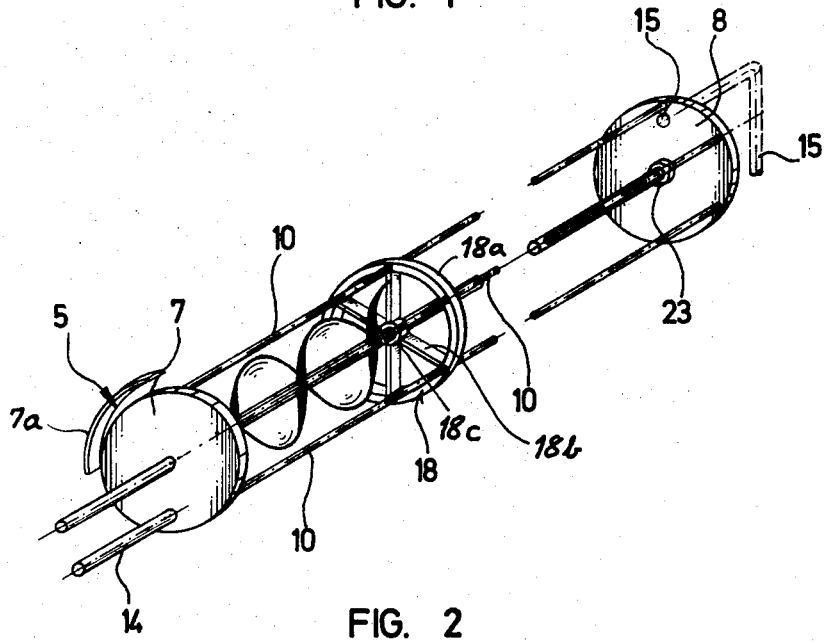
FIG. 2 is a perspective view of the inner tube structure of this dialysis unit, partly broken away and with the membrane removed.

An inlet conduit 14 extends through the cap 3 and terminates in the plate 7 while communicating with the inner compartment 12 to deliver the liquid to be subjected to dialysis to this inner compartment at the left-hand end thereof. As illustrated in FIGS. 1 and 2, the inlet 14 opens into the inner compartment 12 at the lower side of the latter. At the opposite axial end of compartment 12, an outlet conduit 15 is provided, this conduit communicating with compartment 12 at the upper side thereof, i.e., diagonally opposite the inlet 14. The conduit 15 leads the liquor from the compartment 12.

An inlet 16 opens into the interior of the cap 4 at the right-hand end of the pipe 2 and thereby communicates with the outer compartment 13 to deliver the dialyzer liquid thereto. At the opposite axial end, the cap 3 is provided with an outlet conduit 17 through which the dialyzate is led from the outer compartment. Here again, the inlet 16 and the outlet 17 open into the respective compartment 13 at diagonally opposite sides of the axis 9 whereby the liquid traversing the compartment must flow axially and uniformly across the axis and hence ensure continuous flow over the entire cross section of each compartment. When conduits such as those shown at 14, 15 and 16, 17 are employed, the liquids pass in countercurrent (i.e., in opposite directions) through the dialysis unit. The dialyzer liquid flows according to FIG. 1 from right to left and the liquid to be dialyzed flows from left to right.

It will be apparent that the membrane tube 6 is removable and, while we have not illustrated in detail any means for anchoring the membrane to the disks 7 and 8, it should be noted that such means may include a strap, fragmentarily represented at 7a, which may be tightened about the marginal portion of the membrane overlying the disk 7 and clamped therearound by spring or screw pressure.

To replace the membranous tube 6, therefore, it is merely necessary to remove the caps 3 or 4 at the ends of the unit to achieve access to the strips 7a etc., retaining the membranous tube 6 upon the inner support.

In practice, the dialysis unit 1, shown as foreshortened in FIG. 1 for illustrative purposes, is extremely long and may have a length of several meters while its diameter is only a fraction of this length and may range up to a few decimeters. The tube support 5 is, in turn, held in place by the struts 11 and by a shaft 20 which extends axially between the plates along the center of the unit. The shaft 20 rotatable relative to the disks 7 and 8 via seal-type bearings 22 and 23 which prevent leakage between the compartments. To stiffen the cage formed by the tierods 10, we provide one or more rings 18 in axially spaced relationship, the rings 18 being traversed by the tierods 10. As shown in FIG. 2, the ring 18 may have a circular felly 18a connected by spokes 18b with a hub 18c, the spokes 18b being each radially aligned with one of the tierods 10.

Within the inner compartment 12 and coaxial with the pipe axis 9, we provide a single-helix worm 19 which is best seen in in FIG. 2. The worm, which has a diameter equal to a major fraction of the diameter of the inner compartment 12 and therefore has a sweep corresponding to a major fraction of the cross-section thereof, is mounted upon the shaft 20 and is rotatable therewith to further prevent the formation of stagnant layers along the inner surface of the membranous tube 6.

The shaft 20 projects at its ends 20a and 20b axially beyond the plates 7 and 8 and is provided at the end 20a with a claw-type coupling 25 detachably engaging the mating coupling of a shaft 20c sealingly journaled in the cap 3. The shaft 20c is provided with a driven V-belt pulley 20d which is connected to a motor 21 and its driving pulley 21a by a V-belt 21b It will be apparent that, when the units 1 are ganged or provided in a bank in cascade, all of the agitators 19 of a given bank may be driven by a single motor using the principles of V-belt transmissions as illustrated in connection with FIG. 1. Also, when a plurality of such banks are connected in a dialysis installation, a single drive may be produced for all of the agitators.

At its opposite end 20b, the shaft 20 is removably received in a bearing 24 from which it may be withdraw axially to permit replacement of the entire assembly 6–10, 20a and 20b, if necessary. Alternatively or in addition, the assembly 6–8 and 19 may be stripped from the shaft 20 in the axial direction for replacement of the defective parts. The electric motor 21 rotates the worm 19 in a sense tending to displace the liquor in the inner compartment in the direction of movement of the liquor from inlet to outlet and hence from left to right in FIG. 1.

The system of FIG. 1, with respect to the worm 19, has two principal modes of operation. In a first mode of operation, the worm is rotated relative to the stationary inner tube assembly 6, 7, 8, 10, etc. the worm acts as a screw-type conveyor for advancing the liquor to be dialyzed. In a second mode of operation, the worm 19 is stationary and the displacement of the liquor therepast assures an intensive movement of the liquor into contact with the inner surface of the tube 6. This latter mode of operation is principally employed when the liquid to be dialyzed is a low-viscosity fluid while the first mode (rotating worm) is used when the liquor to be dialized is a highly viscous liquid, a suspension or a liquid containing particles subject to sedimentation.

A less effective third mode of operation is obtained when the worm is driven in the opposite sense, i.e., in a sense tending to displace the liquid to be dialyzed against the flow direction from inlet to outlet. In this case, a highly intensive agitation is provided and a high degree of turbulence is achieved.

Mounting posts 26 and 27, which may be tubes forming part of the conduit network, extend diametrically opposite the conduits 17 and 16 at diagonally opposite portions of the unit and from the caps 3 and 4. The mounting posts enable the unit to be connected in vertical banks as will be apparent hereinafter (see FIG. 9).

Figure 3:
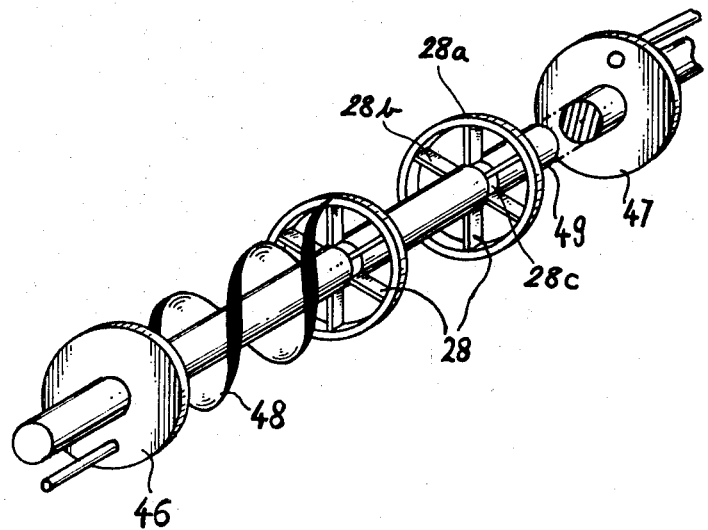
FIG. 3 is a perspective view illustrating another embodiment of the inner tube structure.

In FIG. 3, we have shown another support arrangement for the membranous tube which, although not illustrated in this Figure, may be of the type represented at 6 in FIG. 1. In addition, the inner assembly formed by the membranous tube and the support, may be accommodated in an outer-pipe arrangement of the type shown at 2, 3 and 4 in this latter Figure. In the system of FIG. 3, the end disks 46 and 47 are not spanned by tierods as is the case with the disks 7 and 8 of FIG. 1, nor do they form part of a cage; however they are interconnected by a fixed shaft 49.

Along the shaft 49, there are provided a plurality of stiffening rings 28 which, as in the case of the rings 18, have a circular felly 28a adapted to rest against the inner surface of the membranous tube. The felly is connected with the hub 28c of the respective ring by a plurality of angularly equispaced spokes 28b.

In addition, the membranous tube is supported by a double-screw (double-helix) worm 48, the crest of which lies along an imaginary cylinder surface having an inner diameter corresponding to that of the membranous tube which is fitted thereon. The worms 48, although only one is illustrated in FIG. 3, bridge each pair of stiffening rings 28 and extend between the closure disks 46 and 47 and the proximal stiffening rings. The worms 48 are, moreover, mounted upon the shaft 49. Consequently, the outer peripheral surfaces of the disks 46, 47, of the rings 28, and of the worms 48, all serve to support the membranous tube which is fitted thereover. In this embodiment, the worms have the dual function of, on the one hand guiding the liquid outwardly along the surface of the membranous tube and in this respect are analogous to the single-screw worm of FIG. 1 in its second operational mode, and on the other hand of serving as a support for the membranous tube which function is performed in part by the tierods of the system of FIG. 1. The assembly of FIG. 3 is, of course, supported in the caps 3 and 4 of the outer pipe.

Figure 4:
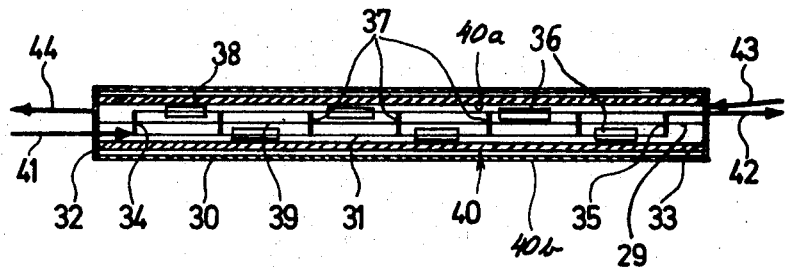
FIG. 4 is a diagrammatic axial cross-section through still another dialysis apparatus according to the invention.

In FIG. 4, we show still another dialysis unit in accordance with the invention, the unit comprising an outer pipe 30 receiving a coaxial inner tube 31 composed of a semipermeable membrane foil. The pipe 30 is provided with fluidtight closures 32 and 33 at its opposite axial extremities, the closures being in the form of caps which are only diagrammatically represented in this Figure. The inner tube 31 is closed at its opposite ends by rigid closure disks 34 and 35 and is supported at intermediate locations along its length with axially spaced support perforate rings 37, e.g., of the type shown at 28 in FIG. 3. The rings 37 are mounted upon a bar 39 extending along the axis of the tube 31 and affixed sealingly to the disks 34 and 35 but fastened to the caps 32 and 33.

The supply line for the inner compartment 39, defined between the disks 33 and 34 within the membranous tube 31, is a conduit 41 which opens into the inner compartment 39 at the bottom thereof. Liquid is removed from the inner compartment 39 and the outlet conduit 42 communicating therewith at the upper side of the compartment. The inlet 43 and the outlet 44 for the fluid traversing the outer compartment 40 may be formed in the caps 32 and 33 as described with respect to the earlier embodiments.

Within the outer compartment 40, there is provided a tubular throttle body 38 which may be removed, but is employed when it is desired to reduce the effective volume of the outer compartment surrounding the membranous tube 31. When the body is used, it subdivides the outer compartment 40 into an inner chamber 40a of smaller cross-section and into an outer chamber 40b. The inlet 43 and the outlet 44 are so disposed with respect to the axis of the system that they lie inwardly of the throttle body 48. In this manner, we are able to adjust the ratio of the inner-compartment volume to the effective outer compartment volume in accordance with the dialization characteristics required. It is evident that similar throttle bodies may be provided for the inner compartment 39, in which case a central zone is shielded from an outer zone, the latter being traversed by the liquid upon flow from the inlet 41 to the outlet 42. A throttle body within the inner compartment 39 may be removed through the removable end plates or disks 34 and 35. The throttle body 38 may be provided with openings as illustrated at 36 in FIG. 4 through which the liquid in the inner chamber 40a may circulate through the outer chamber 40b of the outer compartment 40 as well.

Figure 5:
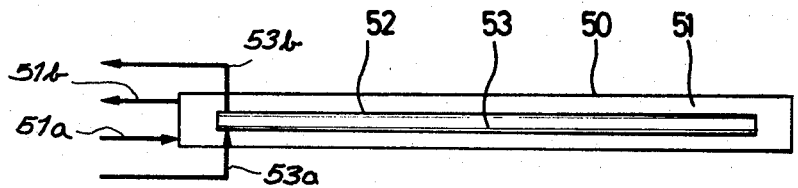
FIG. 5 is a flow diagram illustrating one mode of connection of the dialyzer unit according to the invention.

In FIG. 5, we have illustrated one mode of operation of the system of the present invention in somewhat diagrammatic form. In this Figure, the outer wall of the outer compartment 51 is represented at 50 while the inner wall of this outer compartment and the outer wall of the inner compartment 53 is defined by a tubular membrane 52. In place of inlet and outlet conduits at diagonally opposite ends of the system, the inlet and outlet for the inner compartment 53 may be provided at 53a and 53b respectively, diametrically opposite one another at one end of the unit. Similarly, the inlet 51a and the outlet 51b of the outer compartment 51 communicate therewith at one axial end of the unit. In this system, the outer compartment 51 preferably constitutes the dialyzer space while the inner compartment 53 constitutes the dialyzate space.

Figure 6:
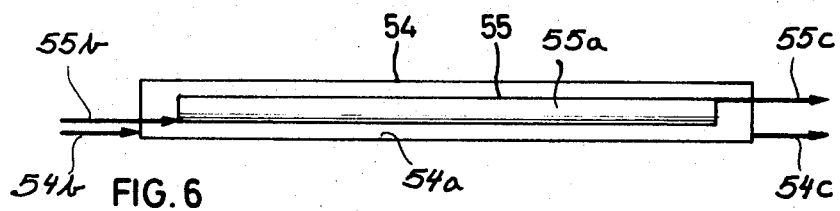
FIG. 6 is a view similar to FIG. 5 illustrating a concurrent mode of flow of the two liquors.

FIG. 6 schematically represents a concurrent mode of operation of the system and in this arrangement, the outer tube 54 and the membranous inner tube 55 define an outer compartment 54a which is traversed by the liquid from an inlet 54b to an outlet 54c at opposite axial ends of the unit. The inlet and outlet 54b and 54c are here located on the same side, (bottom) of the outer tube. In the same direction, fluid is passed through the inner compartment 55a from an inlet 55b to an outlet 55c, the inlet and outlet 55b, 55c being located at diagonally opposite sides of the compartment 55a.

Figure 7:
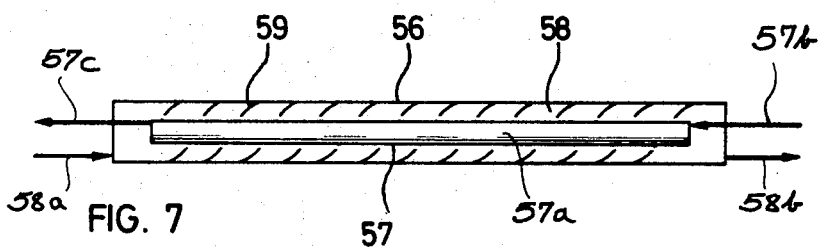
FIG. 7 is a further diagrammatic view of a dialysis unit according to the invention operating under countercurrent flow.

In a third mode of operation represented diagrammatically in FIG. 7, the inner surface of the outer tube 56 is provided with generally radial ribs 59 which extend into the outer compartment 58 and serve to displace the liquid inwardly toward the membranous tube 57. The membranous tube 57 defines the inner compartment 57a which is traversed by liquid passing from an inlet 57b to an outlet 57c, both inlet and outlet being located on the same side (upper side) of the inner compartment. The liquid which is directed against the tube 57 is supplied to the outer compartment by an inlet 58a, and is conducted away through an outlet 58b, both inlet and outlet being disposed at the bottom.

Figure 8:
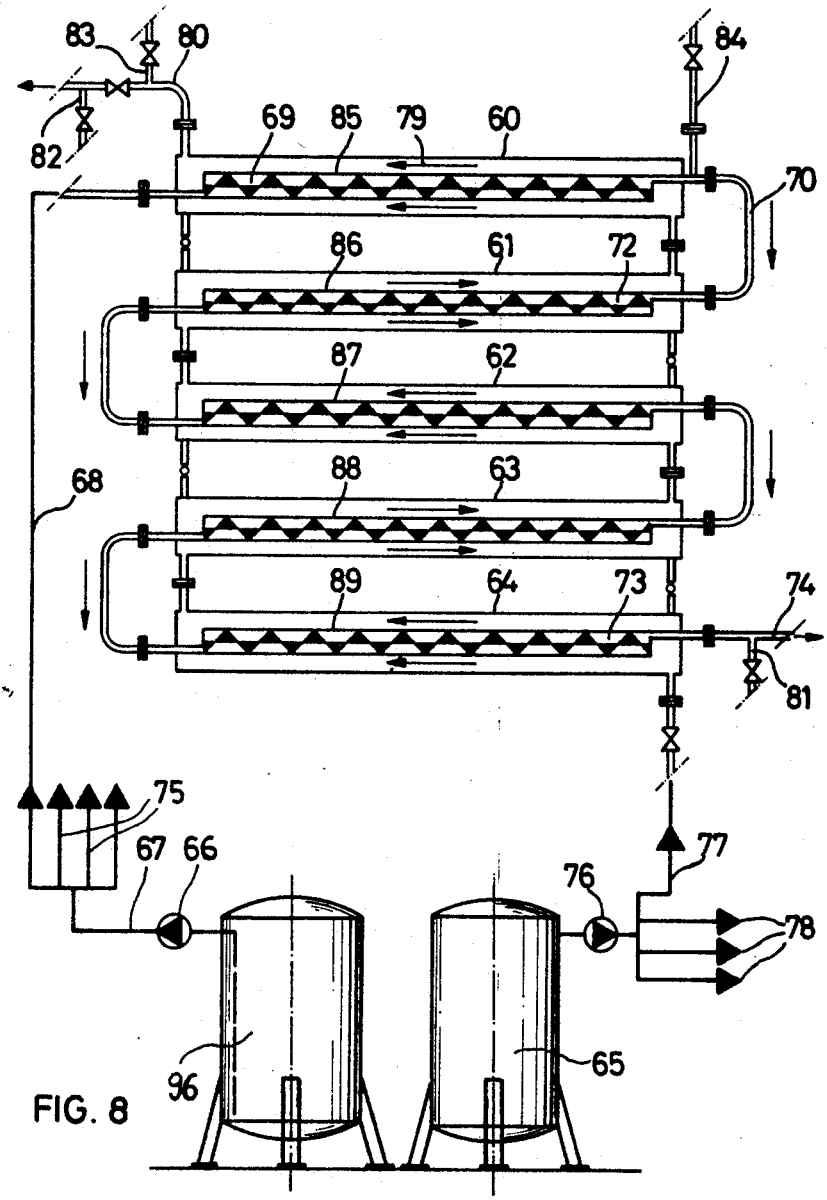
FIG. 8 is a portion of a dialyzer unit bank according to the invention, illustrating some of the conduit networks employed therewith.

FIG. 8 shows a bank consisting of five vertically spaced horizontal dialysis units, each being constructed as described in connection with FIGS. 1 and 2. The dialysis units 60–64 are assembled in a bank. A typical installation for the dialysis of biochemical, biological, biomedical and medical solutions, suspensions and liquids, incorporating such a bank of dialysis units, may comprise a tank or storage vessel 65 containing, for example, calves' blood as obtained in an impure state from a slaughter house and serving as the liquid to be dialyzed. The dialyzer solution is received in a tank or storage vessel 96 and may constitute pyrogen-free sterile water-alcohol mixture. A pump 66 feeds the dialyzer solution to a manifold 75 from which the solution is branched to a plurality of dialyzer banks including the bank illustrated in FIG. 8 and which is connected to the manifold 75 via a line 68. The line 68 communicates with the dialyzer compartment, here the inner compartment, of the first dialyzer unit 60. Upon traversal of this unit, the liquor passes at the other end of the inner compartment 69 to the right-hand end of the inner compartment 72 of dialyzer unit 61 and, in succession, through the inner compartments 73 etc. of the remaining dialyzer units. The dialyzer liquor, containing the substance which has transferred through the membranous tubes in each of the units, is led away at 74.

In a corresponding manner, the dialysate compartments of the dialyzer units are connected in series or cascade, although here the general flow is from lowest unit 64 to the highest unit of the bank. This system, therefore, operates in the countercurrent mode.

Figure 10:
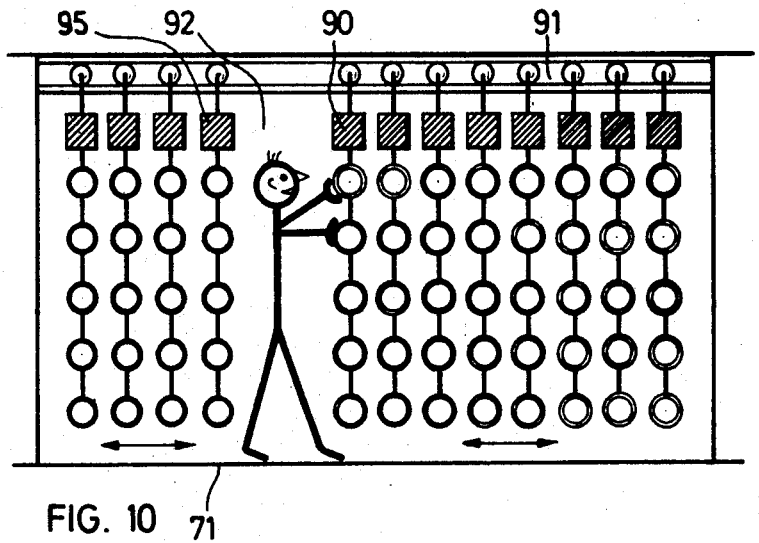
FIG. 10 is a diagram illustrating a plurality of such banks arranged in a dialyzer installation wherein the individual banks of dialyzer units are shiftable for accessibility.

The outer or dialyzate compartment of the lower unit 64 receives the liquor from container 65 via a pump 76 and a manifold 78 which feeds the liquor simultaneously to the parallel-operating banks, e.g., those represented in FIG. 10. From the manifold, a conduit 77 delivers the liquor of receptacle 65 to the outer compartment of unit 64 at the right-hand end thereof, the dialyzate passing upwardly through the compartments of unit 63, 62, 61 and 60, alternately from left to right and right to left. From the upper unit, the dialyzate is removed at 80. Lines 74 and 80 are provided with cocks 81 and 82, respectively, permitting the withdrawal of samples of the solutions at the discharge ends of both sets of compartments. A venting valve 83 is provided at the highest point of the bank to permit discharge of air from the system during initial filling and to permit draining as may be required. At the highest point in the network of the liquor to be dialyzed, there is likewise provided a venting duct 84 and a closable valve.

In the specific example under discussion, the semipermeable tubes 86–89 are designed to permit the passage of molecular weight of 8,000 and, from the calves' blood it is possible to obtain a dialyzate capable of serving as an intravenous preparation for the stimulation of breathing. The dialyzate is free from bacteria, viruses and degradation products and free from pyrogens as well. The properties of the dialyzate can be continuous monitored by draining samples at 82 and subjecting them to pyrogen tests. When the pryrogen test is found to be negative, the dialyzate is suitable for use as indicated, but where a positive pyrogen test is obtained, the semipermeable foils are replaced by membranes which have smaller cross-sections. This example is merely illustrative of the invention and represents a preferred embodiment. However, the system of the present invention has been found to be useful in other processes as well. For example, in the formation of regenerated tobacco, one may form a tobacco pulp or slurry in water and thereby remove water-soluble components. By dialysis of this solution in a dialysis unit, according to the present invention, it is possible to remove the albuminous substances so that only aromatic compounds remain in the dialyzate which can be returned to the tobacco slurry.

Figure 9:
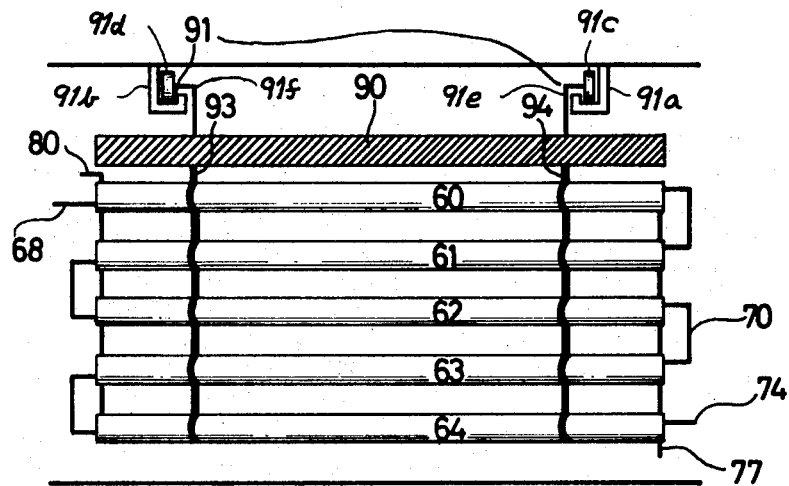
FIG. 9 is a side view of a dialyzer unit bank of the type shown in FIG. 8.

It should be noted that, in the system of FIG. 8, the liquid to be dialyzed, flows in countercurrent to the dialyzer liquid in each of the dialysis units as well as in the entire dialyzer bank. Several such banks may be provided in a relatively small space 71 (FIG. 10) with the assembly constituting a dialysis apparatus in accordance with the invention. As shown in FIG. 9, each dialyzer bank may consist of, say, five dialyzer units 60–64, disposed in vertically spaced relationship upon a common support 90 and secured thereto by pipe-strap clamps represented diagrammatically at 93 and 94. The support 90 is shiftable in a horizontal plane on a pair of horizontal rails 91a, 91b of a trolley arrangement which has been diagrammatically represented at 91 in FIG. 9. In addition to the rails, the trolley arrangement comprises a pair of rollers 91c and 91d, 91f rising from the support 90. Thus each of the banks of dialyzer units is suspended in a vertical plane which may constitute the axial plane of the dialyzer unit as well as the plane of the axis of the rollers 91e and 91f. Aside from the pipe-clamp system 93 and 94, the dialyzer units 60–64 of each bank are interconnected by the mounting posts 26, 27, illustrated in FIG. 1 and described with reference thereto, the mounting posts being paired with one another.

As illustrated in FIG. 10, the individual dialyzer banks can be assembled in horizontally stacked arrangement, i.e., in close juxtaposition, so that adjacent neighboring banks are practically in contact with one another, although a space 92 is provided along the array to accommodate servicing, as represented in FIG. 10. To afford access to any one of the dialyzer units, the banks to the left or right thereof are urged apart so that, between the bank 90 which is to be serviced and the neighboring bank 95, the space 92 is created. In this manner, the space 92 can be shifted along the array of banks until the desired bank or unit is made accessible. In this system, four conduits (68, 77, 74 and 80) are required for each bank and we provide flexible hose or tubing to connect the banks with the liquid source and circulating means, the flexible hoses permitting shifting of the banks as noted. It has also been observed that the units of each bank are connected in cascade and that the banks themselves may be connected in cascade or in parallel.

The dialyzer vessels must from time to time be cleaned and the membranous tubes 6, 31, 85–89 replaced. To this end, we prefer to replace an entire bank of dialyzer units and the apparatus may include one or more space banks which can be connected into the dialyzer circuit when repair or replacement of one of the banks is desired. The valves at the inlet and outlet conduits of the latter dialyzer bank may simply be cut off while the valves of the replacement dialyzer unit are opened.

Furthermore, we have found it desirable to provide the dialyzer vessels of a material resistant to attack by the liquid under treatment and at least the portions of the dialyzer units in contact with the liquid should be composed of glass, polyacrylate resins such as Plexiglass, polyesters, corrosion-resistant metals and synthetic-resin-coated metals. The outer tube or pipe of one or more of the units may be composed of a transparent material to permit observation of the state of the unit and of the process. We have found that it is not necessary to make all of the units of a particular bank with transparent vessels if the last vessel traversed by the dialyzer fluid is so constructed. In the system of FIGS. 8–10, the outer tubes of unit 60 of each of the banks are composed of glass.

The improvement described and illustrated is believed to admit of many modifications within the ability of persons skilled in the art, all such modifications being considered within the spirit and scope of the invention except as limited by the appended claims.

We claim:

1. A dialysis apparatus comprising:
   an outer pipe;
   a pair of cap means including at least one removable cap closing the ends of said outer pipe;
   at least one pair of rigid disks axially spaced apart in said outer pipe and provided with angularly spaced outwardly extending members engaging said pipe for supporting said disks within said pipe; at least one rigid element extending axially between said disks for adjustably spacing same apart;
   a semipermeable foil tube surrounding said element and in part supported thereon, said tube being of substantially circular configuration and defining with said tube a first liquid flow path and between said tube and said pipe a second liquid flow path;
   an inlet formed in one of said disks and an outlet formed in the other disk and provided with respective conduits leading through said caps for passing said first liquid through the interior of said tube;
   an outlet formed in at least one of said caps and an inlet formed in at least one of said caps provided with respective ducts for passing said second fluid through said pipe around said tube; and
   means for supporting said outer pipe in a dialyzer bank with other similar pipes and respective tubes whereby said ducts and conduits can be connected in respective fluid circuits, said cap being removable to permit replacement of said tube and said disks as a unit.

2. The apparatus defined in claim 1 wherein said element includes a worm rotatable in said tube and drive means on said pipe detachable from but engageable with said worm for rotating same.

* * * * *